US012672180B2

(12) United States Patent
Kainulainen et al.

(10) Patent No.: US 12,672,180 B2
(45) Date of Patent: Jun. 30, 2026

(54) INITIAL NETWORK ACCESS FOR A WIRELESS COMMUNICATION DEVICE

(71) Applicant: Telefonaktiebolaget LM Ericsson (publ), Stockholm (SE)

(72) Inventors: Jani-Pekka Kainulainen, London (GB); Veikko Oittinen, Kirkkonummi (FI); Ari Keränen, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/253,329

(22) PCT Filed: Jun. 26, 2018

(86) PCT No.: PCT/EP2018/067091
§ 371 (c)(1),
(2) Date: Dec. 17, 2020

(87) PCT Pub. No.: WO2020/001748
PCT Pub. Date: Jan. 2, 2020

(65) Prior Publication Data
US 2021/0266993 A1 Aug. 26, 2021

(51) Int. Cl.
*H04W 60/04* (2009.01)
*H04W 8/18* (2009.01)
(Continued)

(52) U.S. Cl.
CPC ............. *H04W 76/14* (2018.02); *H04W 8/18* (2013.01); *H04W 8/24* (2013.01); *H04W 48/10* (2013.01); *H04W 48/14* (2013.01)

(58) Field of Classification Search
None
See application file for complete search history.

(56) References Cited

U.S. PATENT DOCUMENTS 9,948,641 B2    4/2018   Ahrens et al.
2014/0189362 A1*  7/2014   Van Den Broeck ........................
G06F 11/1446
713/176
(Continued)

FOREIGN PATENT DOCUMENTS

DE    102014014078 A1   3/2016
GB       2522044 A    7/2015
WO     2018001449 A1   1/2018

OTHER PUBLICATIONS

3rd Generation Partnership Project, "3rd Generation Partnership Project;Technical Specification Group Radio Access Network; Study on New Radio Access Technology: Radio Access Architecture and Interfaces (Release 14)", Technical Report, 3GPP TR 38.801 V14. 0.0, Mar. 1, 2017, pp. 1-91, 3GPP.
(Continued)

*Primary Examiner* — Gary Lafontant
(74) *Attorney, Agent, or Firm* — COATS & BENNETT, PLLC

(57) ABSTRACT
There is provided mechanisms for initial network access for a first wireless communication device to a wireless network. A method is performed by the first wireless communication device. The method comprises providing, as part of performing initial access of the first wireless communication device to the wireless network, a request to a second wireless communication device for assisted connection initialization of the first wireless communication device to the wireless network. The method comprises obtaining connection parameters from the second wireless communication device. The parameters are based on the network configuration. The method comprises establishing, using the connection parameters and without further assistance from the second wireless communication device, a connection to the wireless network.

10 Claims, 11 Drawing Sheets

(51) Int. Cl.
  *H04W 8/24*    (2009.01)
  *H04W 48/10*   (2009.01)
  *H04W 48/14*   (2009.01)
  *H04W 76/14*   (2018.01)

(56)           References Cited

U.S. PATENT DOCUMENTS

| 2016/0065563 | A1* | 3/2016 | Broadbent | .......... H04L 63/0281 726/9 |
| 2016/0073441 | A1 | 3/2016 | Faccin et al. | |
| 2016/0330608 | A1* | 11/2016 | Benn | .................... H04W 12/10 |
| 2017/0079086 | A1* | 3/2017 | Kuge | .................... H04W 8/005 |
| 2021/0274442 | A1* | 9/2021 | Hayashi | ................ H04W 4/027 |

OTHER PUBLICATIONS

3rd Generation Partnership Project, "3rd Generation Partnership Project;Technical Specification Group Services and System Aspects; System Architecture for the 5G System; Stage 2 (Release 15)", Technical Specification, 3GPP TS 23.501 V1.0.0, Jun. 1, 2017, pp. 1-146, 3GPP.

\* cited by examiner

100

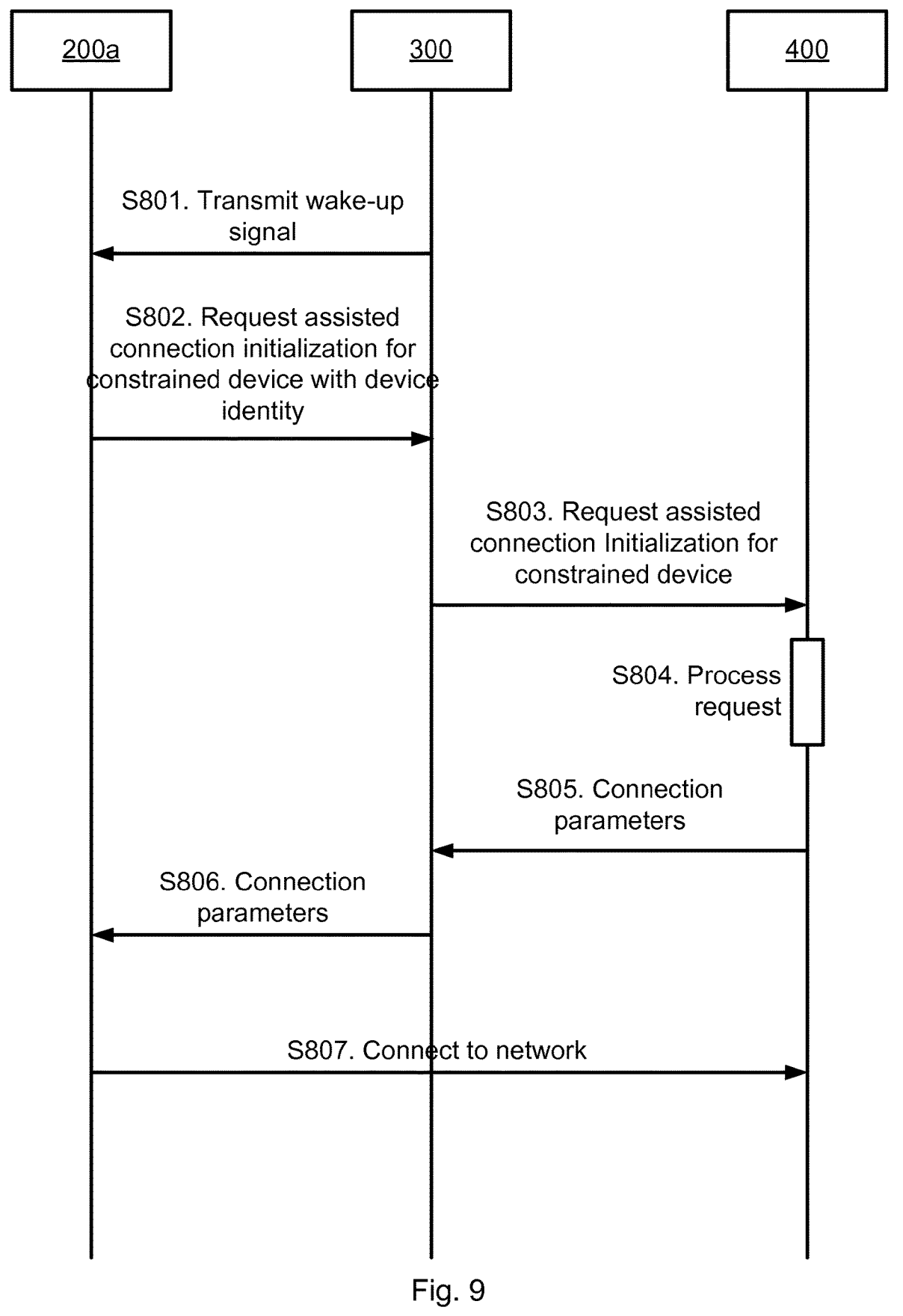

| 200a | 300 | 400 |
|------|-----|-----|

S801. Transmit wake-up signal

S802. Request assisted connection initialization for constrained device with device identity S803. Request assisted connection Initialization for constrained device S804. Process request S805. Connection parameters S806. Connection parameters S807. Connect to network

Fig. 9

INITIAL NETWORK ACCESS FOR A WIRELESS COMMUNICATION DEVICE

TECHNICAL FIELD

Embodiments presented herein relate to a method, a first wireless communication device, a computer program, and a computer program product for initial network access for the first wireless communication device to a wireless network. Further embodiments presented herein relate to a method, a second wireless communication device, a computer program, and a computer program product for enabling initial network access for the first wireless communication device to the wireless network. Further embodiments presented herein relate to a method, a network entity, a computer program, and a computer program product for providing initial network access for the first wireless communication device to the wireless network.

BACKGROUND

In communication networks, there may be a challenge to obtain good performance and capacity for a given communications protocol, its parameters and the physical environment in which the communication network is deployed.

For example, one parameter in providing good performance and capacity for a given communications protocol in a communication network is the ability for wireless communication devices served by the communication network to quickly and efficiently establish an operational connection to the communication network.

In general terms, wireless communication devices need to exchange a comparatively large number of messages with the communication network in order to establish a connection to the communication network.

For battery-operated wireless communication devices such a connection establishment procedure might thus drain a significant amount of the battery life of the wireless communication device and the connection establishment procedure might take a significant amount of time.

One non-limiting and illustrative example is wireless communication devices in the form of so-called Internet-of-Things devices. In a large number of deployments of Internet-of-Things devices there can be hundreds or thousands of Internet-of-Things devices to install. If establishing an operational connection to the communication network for one single Internet-of-Things device takes tens of seconds, or even a minute or more, an on-boarding process does not scale if installing personnel needs to wait and ensure, on site, that all Internet-of-Things device devices become connected.

As concluded in "Cellular Internet of Things: Technologies, Standards and Performance" by Liberg O., Sundberg M., Eric Wang Y.-P., Bergman J., Sachs J., Academic Press, 2017, for initial Public Land Mobile Network (PLMN) or cell selection, a cellular Internet-of-Things device may need to scan all supported (frequency) bands to find the operator service. This procedure can take up to 10 minutes for a device supporting quad band GSM operation in 850, 900, 1850 and 1900 MHz frequency bands. This initial connection search procedure may therefore consume notable portion of the battery life before the Internet-of-Things device can even begin signaling with the network, possibly shortening deployment lifetime with months or even years.

Hence, there is still a need for an improved initial network access for wireless communication devices to communication networks.

SUMMARY

An object of embodiments herein is to provide efficient initial network access for a wireless communication device to a wireless network, where the above issues are reduced, mitigated, or even overcome.

According to a first aspect there is presented a method for initial network access for a first wireless communication device to a wireless network. The method is performed by the first wireless communication device. The method comprises providing, as part of performing initial access of the first wireless communication device to the wireless network, a request to a second wireless communication device for assisted connection initialization of the first wireless communication device to the wireless network. The method comprises obtaining connection parameters from the second wireless communication device. The parameters are based on the network configuration. The method comprises establishing, using the connection parameters and without further assistance from the second wireless communication device, a connection to the wireless network.

According to a second aspect there is presented a first wireless communication device for initial network access for the first wireless communication device to a wireless network. The first wireless communication device comprises processing circuitry. The processing circuitry is configured to cause the first wireless communication device to provide, as part of performing initial access of the first wireless communication device to the wireless network, a request to a second wireless communication device for assisted connection initialization of the first wireless communication device to the wireless network. The processing circuitry is configured to cause the first wireless communication device to obtain connection parameters from the second wireless communication device. The parameters are based on the network configuration. The processing circuitry is configured to cause the first wireless communication device to establish, using the connection parameters and without further assistance from the second wireless communication device, a connection to the wireless network.

According to a third aspect there is presented a first wireless communication device for initial network access for the first wireless communication device to a wireless network. The first wireless communication device comprises a provide module configured to provide, as part of performing initial access of the first wireless communication device to the wireless network, a request to a second wireless communication device for assisted connection initialization of the first wireless communication device to the wireless network. The first wireless communication device comprises an obtain module configured to obtain connection parameters from the second wireless communication device. The parameters are based on the network configuration. The first wireless communication device comprises an establish module configured to establish, using the connection parameters and without further assistance from the second wireless communication device, a connection to the wireless network.

According to a fourth aspect there is presented a computer program for initial network access for a first wireless communication device to a wireless network. The computer program comprises computer program code which, when run on processing circuitry of the first wireless communication device, causes the first wireless communication device to perform a method according to the first aspect.

According to a fifth aspect there is presented a method for enabling initial network access for a first wireless communication device to a wireless network. The method is performed by a second wireless communication device. The method comprises obtaining, as part of initial access of the first wireless communication device to the wireless network, a request for assisted connection initialization of the first wireless communication device to the wireless network. The method comprises obtaining network configuration for the first wireless communication device from the network entity. The method comprises providing connection parameters to the first wireless communication device. The parameters are based on the network configuration and comprise information enabling the first wireless communication device to establish a connection to the wireless network without further assistance from the second wireless communication device.

According to a sixth aspect there is presented a second wireless communication device for enabling initial network access for a first wireless communication device to a wireless network. The second wireless communication device comprises processing circuitry. The processing circuitry is configured to cause the second wireless communication device to obtain, as part of initial access of the first wireless communication device to the wireless network, a request for assisted connection initialization of the first wireless communication device to the wireless network. The processing circuitry is configured to cause the second wireless communication device to obtain network configuration for the first wireless communication device from the network entity. The processing circuitry is configured to cause the second wireless communication device to provide connection parameters to the first wireless communication device. The parameters are based on the network configuration and comprise information enabling the first wireless communication device to establish a connection to the wireless network without further assistance from the second wireless communication device.

According to a seventh aspect there is presented a second wireless communication device for enabling initial network access for a first wireless communication device to a wireless network. The second wireless communication device comprises an obtain module configured to obtain, as part of initial access of the first wireless communication device to the wireless network, a request for assisted connection initialization of the first wireless communication device to the wireless network. The second wireless communication device comprises an obtain module (410f) configured to obtain network configuration for the first wireless communication device from the network entity. The second wireless communication device comprises a provide module configured to provide connection parameters to the first wireless communication device. The parameters are based on the network configuration and comprise information enabling the first wireless communication device to establish a connection to the wireless network without further assistance from the second wireless communication device.

According to an eighth aspect there is presented a computer program for enabling initial network access for a first wireless communication device to a wireless network. The computer program comprises computer program code which, when run on processing circuitry of a second wireless communication device, causes the second wireless communication device to perform a method according to the fifth aspect.

According to a ninth aspect there is presented a method for providing initial network access for a first wireless communication device to a wireless network. The method is performed by a network entity. The method comprises obtaining a request from a second wireless communication device for connection initialization of the first wireless communication device to the wireless network. The method comprises providing network configuration for the first wireless communication device to the second wireless communication device.

According to a tenth aspect there is presented a network entity for providing initial network access for a first wireless communication device to a wireless network. The network entity comprises processing circuitry. The processing circuitry is configured to cause the network entity to obtain a request from a second wireless communication device for connection initialization of the first wireless communication device to the wireless network. The processing circuitry is configured to cause the network entity to provide network configuration for the first wireless communication device to the second wireless communication device.

According to an eleventh aspect there is presented a network entity for providing initial network access for a first wireless communication device to a wireless network. The network entity comprises an obtain module configured to obtain a request from a second wireless communication device for connection initialization of the first wireless communication device to the wireless network. The network entity comprises a provide module configured to provide network configuration for the first wireless communication device to the second wireless communication device.

According to a twelfth aspect there is presented a computer program for providing initial network access for a first wireless communication device to a wireless network, the computer program comprising computer program code which, when run on processing circuitry of a network entity, causes the network entity to perform a method according to the ninth aspect.

According to a thirteenth aspect there is presented a computer program product comprising a computer program according to at least one of the fourth aspect, the eight aspect, and the twelfth aspect and a computer readable storage medium on which the computer program is stored. The computer readable storage medium can be a non-transitory computer readable storage medium.

Advantageously these methods, these first wireless communication devices, these second wireless communication devices, these network entities, and these computer programs provide efficient initial network access for the wireless communication device to the wireless network.

Advantageously these methods, these first wireless communication devices, these second wireless communication devices, these network entities, and these computer programs enable the initial connection speed for the first wireless communication device to be increased.

Advantageously these methods, these first wireless communication devices, these second wireless communication devices, these network entities, and these computer programs enable the implementation complexity of the first wireless communication device needed for the connection initialization to be reduced.

Advantageously these methods, these first wireless communication devices, these second wireless communication devices, these network entities, and these computer programs enable the required processing of the first wireless communication device to be reduced.

Advantageously these methods, these first wireless communication devices, these second wireless communication devices, these network entities, and these computer programs enable the battery life of the first wireless communication device to be prolonged.

It is to be noted that any feature of the first, second, third, fourth, fifth, sixth seventh, eight, ninth, tenth, eleventh, twelfth, and thirteen aspects may be applied to any other aspect, wherever appropriate. Likewise, any advantage of the first aspect may equally apply to the second, third, fourth, fifth, sixth, seventh, eight, ninth, tenth, eleventh twelfth, and/or thirteenth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 5, 6, 7, 8, and 9 are signalling diagrams according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
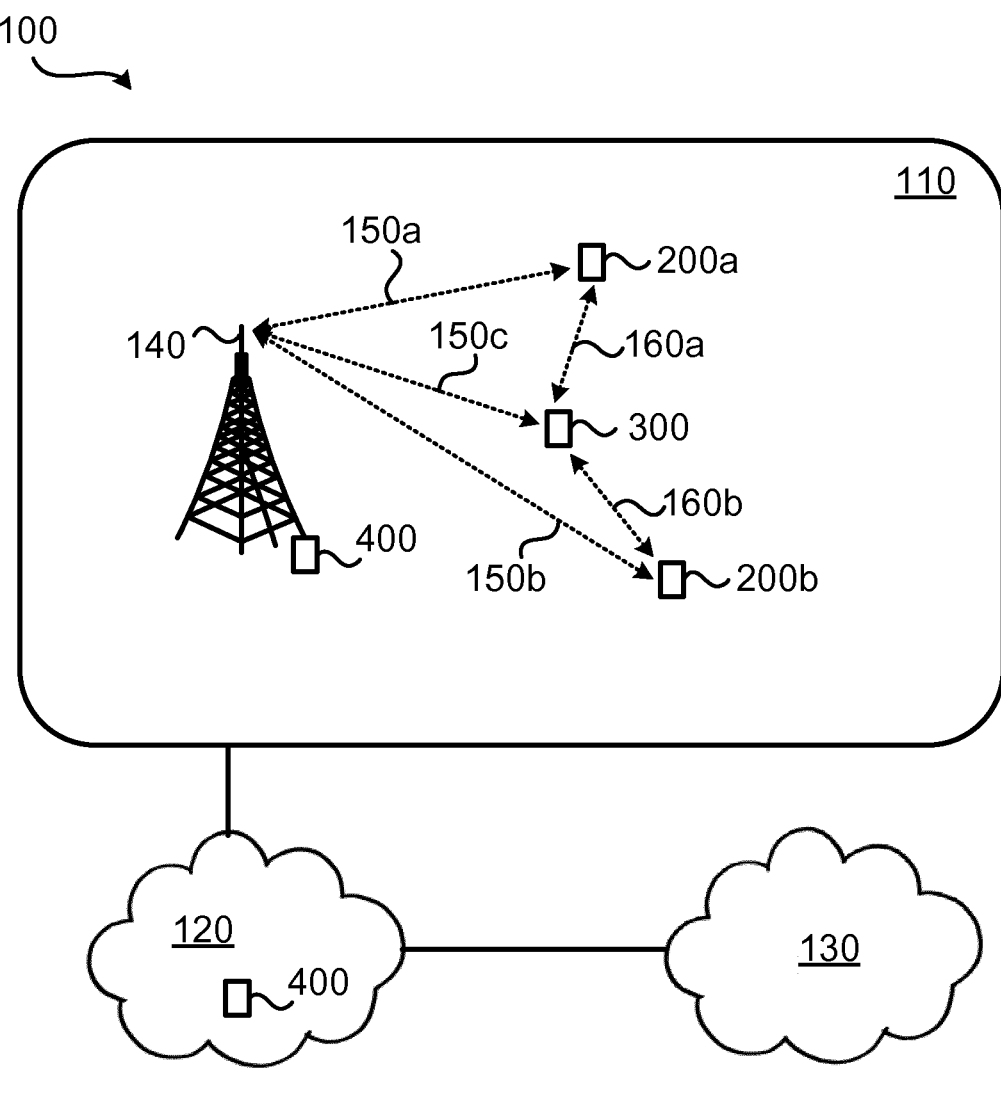
FIG. 1 is a schematic diagram illustrating a communication network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard, where applicable. The communications network 100 could be a cellular radio network, a wireless local area network, or a wireless wide area network.

The communications network 100 comprises a network node 140 configured to provide network access to wireless communication devices 200a, 200b, 300 in a radio access network 110. The network node 140 could be a radio access network node, radio base station, base transceiver station, node B, evolved node B, gNB, or access point.

The radio access network 11o is operatively connected to a core network 120. The core network 120 is in turn operatively connected to a service network 130, such as the Internet. The wireless communication devices 200a, 200b, 300 are thereby enabled to access services of, and exchange data with, the service network 130.

The communications network 100 further comprises a network entity 400. In general terms, the network entity 400 is involved when establishing an operational connection from the wireless communication devices 200a, 200b, 300 to the network. The network entity 400 might be a core network entity 400 or a radio access network entity 400. Further details of the network entity 400 will be provided below.

It is assumed that all the wireless communication devices 200a, 200b, 300 are configured to establish an operational connection to the same wireless network 100. In this respect, the wireless communication devices 200a, 200b, 300 are configured to communicate with the network entity 400 via the network node 140 over communication links 150a, 150b, 150c and are also configured to communicate with at least one other wireless communication device over communication links 160a, 160b. In this respect, a first communication technology might be used for the communication links 160a, 160b and a second communication technology might be used for the communication links 150a, 150b, 150c. Examples of first communication technologies and second communication technologies will be provided below.

Further, there could be different types of wireless communication devices 200a, 200b, 300. In this respect, the wireless communication devices 200a, 200b represent two examples of a wireless communication device of a first type, and the wireless communication device 300 represents one example of a wireless communication device of a second type. In some aspects the wireless communication device of the first type is more constrained, for example in terms of battery life, processing power, output power, etc., than the wireless communication device of the second type. Particularly, each wireless communication devices 200a, 200b of the first type might be an Internet of Things device, a machine type communication device, or, a mobile phone, or a user equipment. The wireless communication device 300 of the second type could be a mobile phone, user equipment, or tablet computer.

The wireless communication devices 200a, 200b of the first type will hereinafter be denoted first wireless communication devices 200a, 200b and the wireless communication device 300 of the second type will hereinafter be denoted a second wireless communication device 300. In some of the figures the term wireless communication devices is abbreviated as WCD.

The embodiments disclosed herein thus relate to mechanisms for initial network access for a first wireless communication device 200*a* to a wireless network 100. In order to obtain such mechanisms there is provided a first wireless communication device 200*a*, a method performed by the first wireless communication device 200*a*, a computer program product comprising code, for example in the form of a computer program, that when run on processing circuitry of the first wireless communication device 200*a*, causes the first wireless communication device 200*a* to perform the method.

In order to obtain such mechanisms there is further provided a second wireless communication device 300, a method performed by the second wireless communication device 300, and a computer program product comprising code, for example in the form of a computer program, that when run on processing circuitry of the second wireless communication device 300, causes the second wireless communication device 300 to perform the method. In order to obtain such mechanisms there is further provided a network entity 400, a method performed by the network entity 400, and a computer program product comprising code, for example in the form of a computer program, that when run on processing circuitry of the network entity 400, causes the network entity 400 to perform the method.

Figure 2:
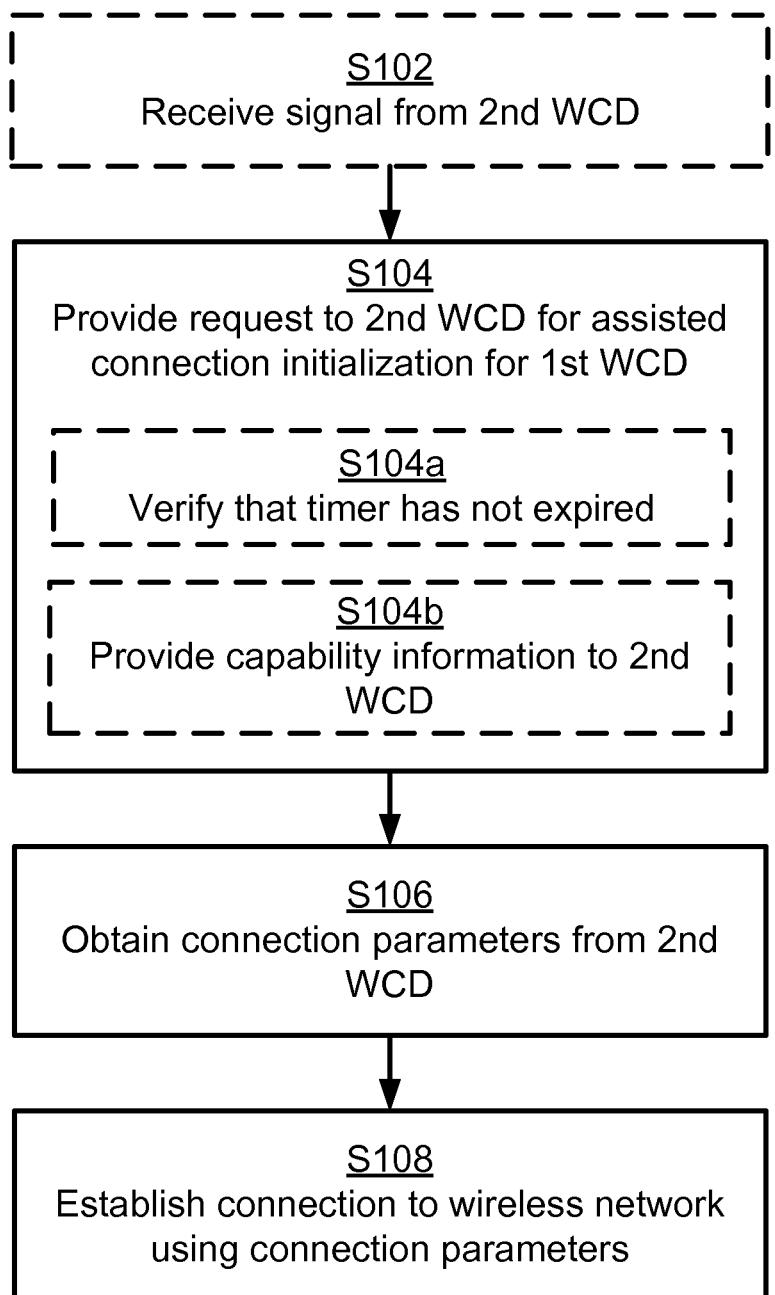
FIGS. 2, 3, and 4 are flowcharts of methods according to embodiments.

Reference is now made to FIG. 2 illustrating a method for initial network access for a first wireless communication device 200*a* to a wireless network 100 as performed by the first wireless communication device 200*a* according to an embodiment.

When the first wireless communication device 200*a* is to join the wireless network 100, it requests a trusted second wireless communication device 300 for assistance in obtaining network configuration information so that the join process can be expedited. Hence, the first wireless communication device 200*a* is configured to perform step S104:

S104: The first wireless communication device 200*a* provides, as part of performing initial access of the first wireless communication device 200*a* to the wireless network 100, a request to a second wireless communication device 300 for assisted connection initialization of the first wireless communication device 200*a* to the wireless network 100.

It is assumed that the second wireless communication device 300 responds to the first wireless communication device 200*a*. Hence, the first wireless communication device 200*a* is configured to perform step S106:

S106: The first wireless communication device 200*a* obtains connection parameters from the second wireless communication device 300. The parameters are based on the network configuration.

The first wireless communication device 200*a* then establishes a connection to the wireless network 100. Particularly, the first wireless communication device 200*a* is configured to perform step S108:

S108: The first wireless communication device 200*a* establishes, using the connection parameters and without further assistance from the second wireless communication device 300, a connection to the wireless network 100.

Because the second wireless communication device 300 performs the initial signalling on behalf of the first wireless communication device 200*a*, the first wireless communication device 200*a* can save battery and processing power.

Also, since the second wireless communication device 300 can be better aware of the network parameters and possible configurations of the wireless network 100 than the first wireless communication device 200*a* (e.g., the second wireless communication device 300 has been connected to the wireless network 100 before whereas the first wireless communication device 200*a* is switched on for the first time), the second wireless communication device 300 can perform the signalling more efficiently than the first wireless communication device 200*a* and thus expedite the process.

Embodiments relating to further details of initial network access for the first wireless communication device 200*a* to a wireless network 100 as performed by the first wireless communication device 200*a* will now be disclosed.

There could be different types of requests that are provided to the second wireless communication device 300 in step S104.

In some aspects the request provided from the first wireless communication device 200*a* to the second wireless communication device 300 at least comprises the ID of the first wireless communication device 200. That is, according to an embodiment the request comprises an identifier of the first wireless communication device 200*a*.

In some aspects the first wireless communication device 200*a* provides in the request, or separately, such as upon request from the second wireless communication device 300, capability information to the second wireless communication device 300. Particularly, according to an embodiment the first wireless communication device 200*a* is configured to perform (optional) step S104*b*:

S104*b*: The first wireless communication device 200*a* provides capability information of the first wireless communication device 200*a* to the second wireless communication device 300.

In some aspects step S104*b* is performed as part of step S104.

The first wireless communication device 200*a* might authorize the second wireless communication device 300 to perform signalling on its behalf by providing a token signed by its network credentials. In some aspects the first wireless communication device 200*a* thus provides a token signed with its 3GPP credentials to the second wireless communication device 300. That is, according to an embodiment the request comprises a token signed by network credentials of the first wireless communication device 200*a*. The network credentials might be 3GPP credentials stored in a (embedded) subscriber identity module of the first wireless communication device 200*a*.

The first wireless communication device 200*a* might communicate with the second wireless communication device 300 and the wireless network 100 over two different communication technologies. That is, according to an embodiment the first wireless communication device 200*a* uses a first communication technology for providing the request and for obtaining the connection parameters, and uses a second communications technology for establishing the connection to the wireless network 100.

There could be different types of first communication technologies. Examples include, but are not limited to, short range radio interfaces, such as Bluetooth®, and wired interfaces, such as a wired serial interface.

There could be different types of second communication technologies. Examples include, but are not limited to communications technologies as used in third, fifth, or fifth generation cellular telecommunications systems, and communications technologies as used in the IEEE 802.11 suite of communication standards, such as Wi-Fi®.

In some aspects, at least one of the first wireless communication device 200a and the second wireless communication device 300 take part in a discovery procedure.

According to a first example the first wireless communication device 200a searches for the second wireless communication device 300 by sending a wake-up signal, including the request to second wireless communication device 300. Particularly, according to an embodiment the request is provided in a wake-up signal transmitted to the second wireless communication device 300.

A search-expiry timer might be used by the first wireless communication device 200a to stop searching for the second wireless communication device 300 and instead continue with traditional connection establishment procedure without the second wireless communication device 300. Hence, according to an embodiment the request as provided in step S104 is a second request, and at least one first request has previously been transmitted towards the second wireless communication device 300 for the same assisted connection initialization. According to this embodiment the first wireless communication device 200a is then configured to perform (optional) step S104a:

S104a: The first wireless communication device 200a verifies that a timer as started upon first transmission of the at least one first request has not expired before providing the second request.

In some aspects step S104a is performed as part of step S104.

According to a second example and a third example the second wireless communication device 300 transmits a signal that the first wireless communication device 200a receives. Thus, according to an embodiment the first wireless communication device 200a is configured to perform (optional) step S102:

S102: The first wireless communication device 200a receives a signal from the second wireless communication device 300. The request is then provided in step S104 to the second wireless communication device 300 in response thereto (i.e., in response to the first wireless communication device 200a having received the signal in step S102).

There could be different types of signals that are received in step S102.

According to the second example the second wireless communication device 300 broadcasts its presence, and the first wireless communication device 200a responds to the second wireless communication device 300 with the request. That is, according to an embodiment the signal is a broadcast signal, and the broadcast signal comprises identity information of the second wireless communication device 300.

According to the third example the first wireless communication device 200a listens for a dedicated wake-up signal, the second wireless communication device 300 sends the dedicated wake-up signal to the first wireless communication device 200a, and the first wireless communication device 200a responds with the request. Hence, according to an embodiment the signal is a wake-up signal, and wherein the wake-up signal comprises identity information of the first wireless communication device 200a.

Figure 3:
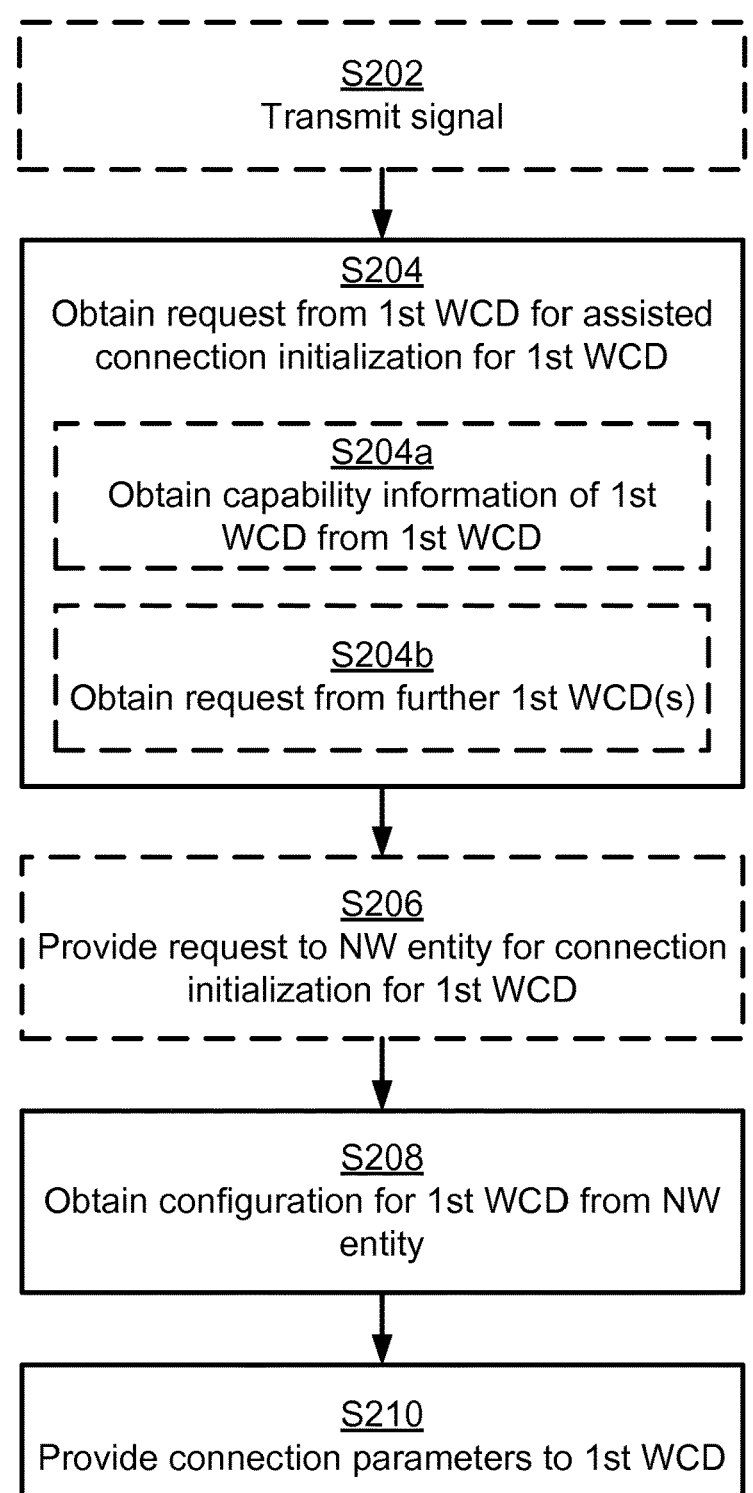

Reference is now made to FIG. 3 illustrating a method for enabling initial network access for a first wireless communication device 200a to a wireless network 100 as performed by the second wireless communication device 300 according to an embodiment.

It is assumed that the second wireless communication device 300 obtains a request for assisted connection initialization for the first wireless communication device 200a.

Hence, the second wireless communication device 300 is configured to perform step S204:

S204: The second wireless communication device 300 obtains, as part of initial access of the first wireless communication device 200a to the wireless network 100, a request for assisted connection initialization of the first wireless communication device 200a to the wireless network 100.

The second wireless communication device 300 in response thereto obtains the necessary information. Particularly, the second wireless communication device 300 is configured to perform step S2o8:

S208: The second wireless communication device 300 obtains network configuration for the first wireless communication device 200a from the network entity 400. Examples of how the second wireless communication device 300 might obtain the network configuration will be disclosed below.

Once having obtained the network configuration the second wireless communication device 300 provides the necessary information to the first wireless communication device 200a. Particularly, the second wireless communication device 300 is configured to perform step S210:

S210: The second wireless communication device 300 provides connection parameters to the first wireless communication device 200a. The parameters are based on the network configuration and comprise information enabling the first wireless communication device 200a to establish a connection to the wireless network 100 without further assistance from the second wireless communication device 300.

Embodiments relating to further details of enabling initial network access for the first wireless communication device 200a to the wireless network 100 as performed by the second wireless communication device 300 will now be disclosed.

There could be different types of connection parameters. In general terms, the connection parameters might comprise any information related to the connectivity of the first wireless communication device 200a. For instance, the connection parameters might comprise network address information, quality of service parameters, timer information, radio access related information, security information, and/or application information, such as traffic patterns, for the first wireless communication device 200a regarding how the first wireless communication device 200a should behave on the network. According to some aspects the connection parameters are defined by the network configuration. That is, according to an embodiment the connection parameters are the network configuration itself. According to other aspects the connection parameters are deduced from the network configuration and information already known by the second wireless communication device 300. That is, according to an embodiment the connection parameters are defined by the network configuration and network information accessible by the second wireless communication device 300.

There could be different types of network configurations. In some aspects the network configuration comprises parameters for establishing a connection to the core network and the information already known by the second wireless communication device 300 are parameters for establishing a connection to the radio access network. Particularly, according to an embodiment the network configuration comprises parameters enabling the first wireless communication device 200a to establish a connection to a core network part 120 of the wireless network 100, and the network information accessible by the second wireless communication device

300 comprises parameters enabling the first wireless communication device 200a to establish a connection to a radio access network part 110 of the wireless network 100.

There could be different ways for the second wireless communication device 300 to obtain the network configuration in step S208.

In some aspects the network configuration is obtained from the network entity 400. Particularly, according to an embodiment the second wireless communication device 300 is configured to perform (optional) step S206: S206: The second wireless communication device 300 provides a request to a network entity 400 of the wireless network 100 for connection initialization of the first wireless communication device 200a to the wireless network 100.

In some aspects the request might either be encapsulated on a generic message targeted towards the network entity 400 or it can be transmitted in a dedicated message. For example, the second wireless communication device 300 might send a message comprising the request to an Access Management Function (AMF) entity that passes the message to the correct network entity 400. The network configuration for the first wireless communication device 200a is then obtained, as in step S208, in response thereto (i.e., in response to having provided the request in step S206) from the network entity 400.

In other aspects the second wireless communication device 300 derives the network configuration from its own ongoing communication with the wireless network 100.

As disclosed above, according to an embodiment the request for assisted connection initialization comprises an identifier of the first wireless communication device 200a. The request provided from the second wireless communication device 300 to the network entity 400 might then at least comprises the ID of the first wireless communication device 200a. That is, according to an embodiment the request to the network entity 400 as provided in step S206 comprises the identifier of the first wireless communication device 200a.

As disclosed above, according to an embodiment the request for assisted connection initialization comprises a token signed by network credentials of the first wireless communication device 200a. The request provided from the second wireless communication device 300 to the network entity 400 might then comprise the token. Thus, according to an embodiment the request to the network entity 400 as provided in step S206 comprises the token.

As disclosed above, in some aspects the first wireless communication device 200a provides in the request, or separately, such as upon a second request from the second wireless communication device 300, capability information to the second wireless communication device 300. Hence, according to an embodiment the second wireless communication device 300 is configured to perform (optional) step S204a: S204a: The second wireless communication device 300 obtains capability information of the first wireless communication device 200a.

In some aspects step S204a is performed as part of step S204.

The second wireless communication device 300 might communicate with the first wireless communication device 200a and the wireless network 100 over two different communication technologies. That is, according to an embodiment the second wireless communication device 200b uses a first communication technology for in step S210 providing the connection parameters to the first wireless communication device 200a, and uses a second communications technology for in step S206 providing the request to the network entity 400.

Examples of first communication technologies and second communication technologies have been given above and are equally applicable here. Thus, examples of first communication technologies include, but are not limited to, short range radio interfaces, such as Bluetooth®, and wired interfaces, such as a wired serial interface, and examples of the second communication technologies include, but are not limited to communications technologies as used in third, fifth, or fifth generation cellular telecommunications systems, and communications technologies as used in the IEEE 802.11 suite of communication standards, such as Wi-Fi®.

There could be different ways for the second wireless communication device 300 to obtain the request for assisted connection initialization in step S204.

In some aspects the request in step S204 is obtained from by first wireless communication device 200a itself (by communication being established between the first wireless communication device 200a and the second wireless communication device 300). Particularly, according to an embodiment the request for assisted connection initialization is obtained from the first wireless communication device 200a. The first communication technology might then also be used by the second wireless communication device 300 for in step S204 obtaining the request from the first wireless communication device 200a.

As disclosed above, in some aspects at least one of the first wireless communication device 200a and the second wireless communication device 300 take part in a discovery procedure.

According to the first example the first wireless communication device 200a searches for the second wireless communication device 300 by sending a wake-up signal, including the request to second wireless communication device 300. According to an embodiment the request for assisted connection initialization is thus obtained in a wake-up signal received from the first wireless communication device 200a.

According to the second example and the third example the second wireless communication device 300 transmits a signal (that the first wireless communication device 200a receives). Thus, according to an embodiment the second wireless communication device 300 is configured to perform (optional) step S202:

S202: The second wireless communication device 300 transmits a signal. The request for assisted connection initialization is then obtained in step S204 from the first wireless communication device 200a in response thereto (i.e., in response to the second wireless communication device 300 having transmitted the signal in step S202).

There could be different types of signals that are transmitted in step S202.

According to the second example the second wireless communication device 300 broadcasts its presence. Hence, according to an embodiment the signal is a broadcast signal, and the broadcast signal comprises identity information of the second wireless communication device 300.

According to the third example the second wireless communication device 300 sends a dedicated wake-up signal to the first wireless communication device 200a. Hence, according to an embodiment the signal is wake-up signal, and the wake-up signal comprises identity information of the first wireless communication device 200a.

Alternatively, the user of the first wireless communication device 200a might initiate the connection initialization on the second wireless communication device 300. This may for instance, be in scenarios where the second wireless communication device 300 has a user interface but the first wireless communication device 200a does not have a user interface. In some aspects the request in step S204 is thus obtained by means of human interaction directly on the second wireless communication device 300. Particularly, according to an embodiment the request for assisted connection initialization is obtained from a user interface of the second wireless communication device 300.

The second wireless communication device 300 might, at once, register multiple first wireless communication devices 200a, 200b. The second wireless communication device 300 might thus perform the signalling for a group of first wireless communication devices 200a, 200b and thus reduce the amount of signalling needed in the whole system. In this respect, the second wireless communication device 300 might first receive a respective request from each of a plurality of first wireless communication devices 200a, 200b, and then send one single request to network entity 400 for all the plurality of first wireless communication devices 200a, 200b. The second wireless communication device 300 might then receive one or more responses from the network entity 400, and provide connection parameters to each of the plurality of first wireless communication devices 200a, 200b.

Particularly, according to an embodiment the second wireless communication device 300 is configured to perform (optional) step S204b: S204b: The second wireless communication device 300 obtains, as part of initial access of at least one further wireless communication device 200b to the wireless network 100, a respective further request for assisted connection initialization of each at least one further wireless communication device 200b to the wireless network 100. One joint request is then provided to the network entity 400 for a group of the first wireless communication device 200a and the at least one further wireless communication device 200b having same, or at least similar, network capabilities. The first wireless communication devices 200a, 200b might therefore be grouped together based on their capabilities such that multiple identical communication configurations can be created with one single signalling exchange between the second wireless communication device 300 and the network entity 400.

Any authentication of the first wireless communication devices 200a, 200b might then be performed in groups.

Figure 4:
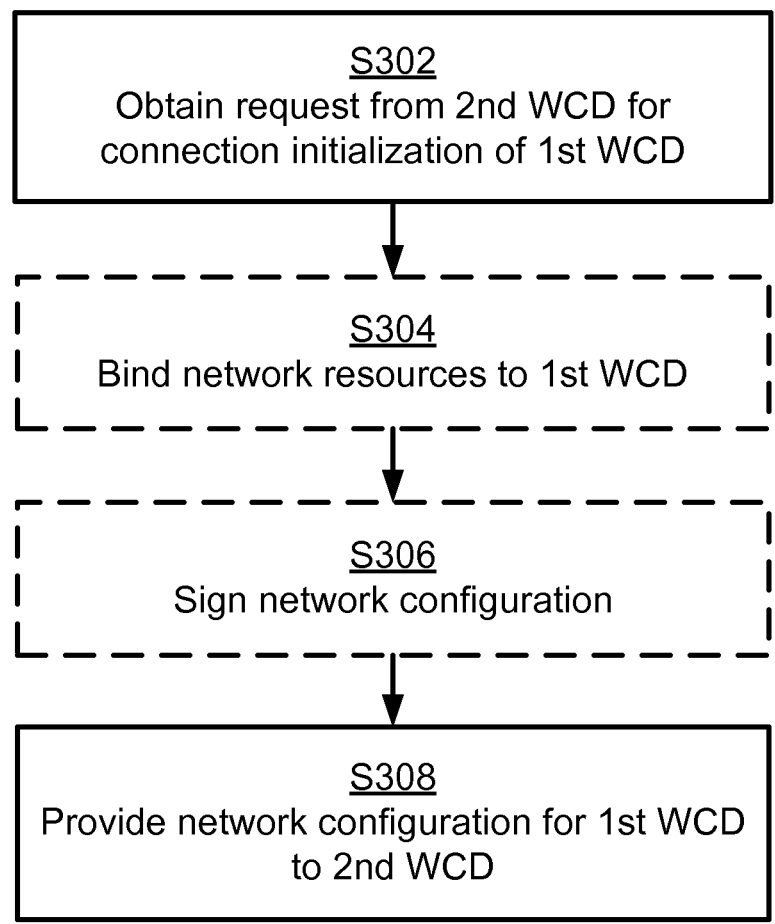

Reference is now made to FIG. 4 illustrating a method for providing initial network access for a first wireless communication device 200a to a wireless network 100 as performed by the network entity 400 according to an embodiment.

As disclosed above, the second wireless communication device 300 in step S206 provides a request to the network entity 400 of the wireless network 100 for connection initialization of the first wireless communication device 200a to the wireless network 100. Hence, the network entity 400 is configured to perform step S302:

S302: The network entity 400 obtains a request from a second wireless communication device 300 for connection initialization of the first wireless communication device 200a to the wireless network 100.

The network configuration is then provided back to the second wireless communication device 300. Hence, the network entity 400 is configured to perform step S308:

S308: The network entity 400 provides network configuration for the first wireless communication device 200a to the second wireless communication device 300.

Embodiments relating to further details of providing initial network access for a first wireless communication device 200a to a wireless network 100 as performed by the network entity 400 will now be disclosed.

As disclosed above, in some aspects the request obtained from the second wireless communication device 300 at least comprises the ID of the first wireless communication device 200a. Thus, according to an embodiment the request obtained from the second wireless communication device 300 comprises an identifier of the first wireless communication device 200a.

In some aspects the network entity 400 creates and binds the first wireless communication device 200a to new or existing network resources. Particularly, according to an embodiment the network entity 400 is configured to perform (optional) step S304:

S304: The network entity 400 binds network resources to the first wireless communication device 200a. The network configuration then identifies the network resources bound to the first wireless communication device 200a.

The network entity 400 might sign the network parameters with device credentials, for example using a shared secret derived from the master secret in the subscriber identity module of the first wireless communication device 200a used to authenticate the first wireless communication device 200a.

Hence, in some aspects the network entity 400 signs network parameters towards the first wireless communication device 200a. Particularly, according to an embodiment the network entity 400 is configured to perform (optional) step S3o6:

S306: The network entity 400 signs the network configuration towards the first wireless communication device 200a before providing the network configuration for the first wireless communication device 200a to the second wireless communication device 300.

This allows the first wireless communication device 200a to verify that the network configuration is unaltered by the second wireless communication device 300 or any other node in-between.

Further the network entity 400 might check subscription information of the first wireless communication device 200a before performing any of steps S304 and S306 in order to bind the correct, or at least correct amount of, network resources to the first wireless communication device 200a.

Figure 5:
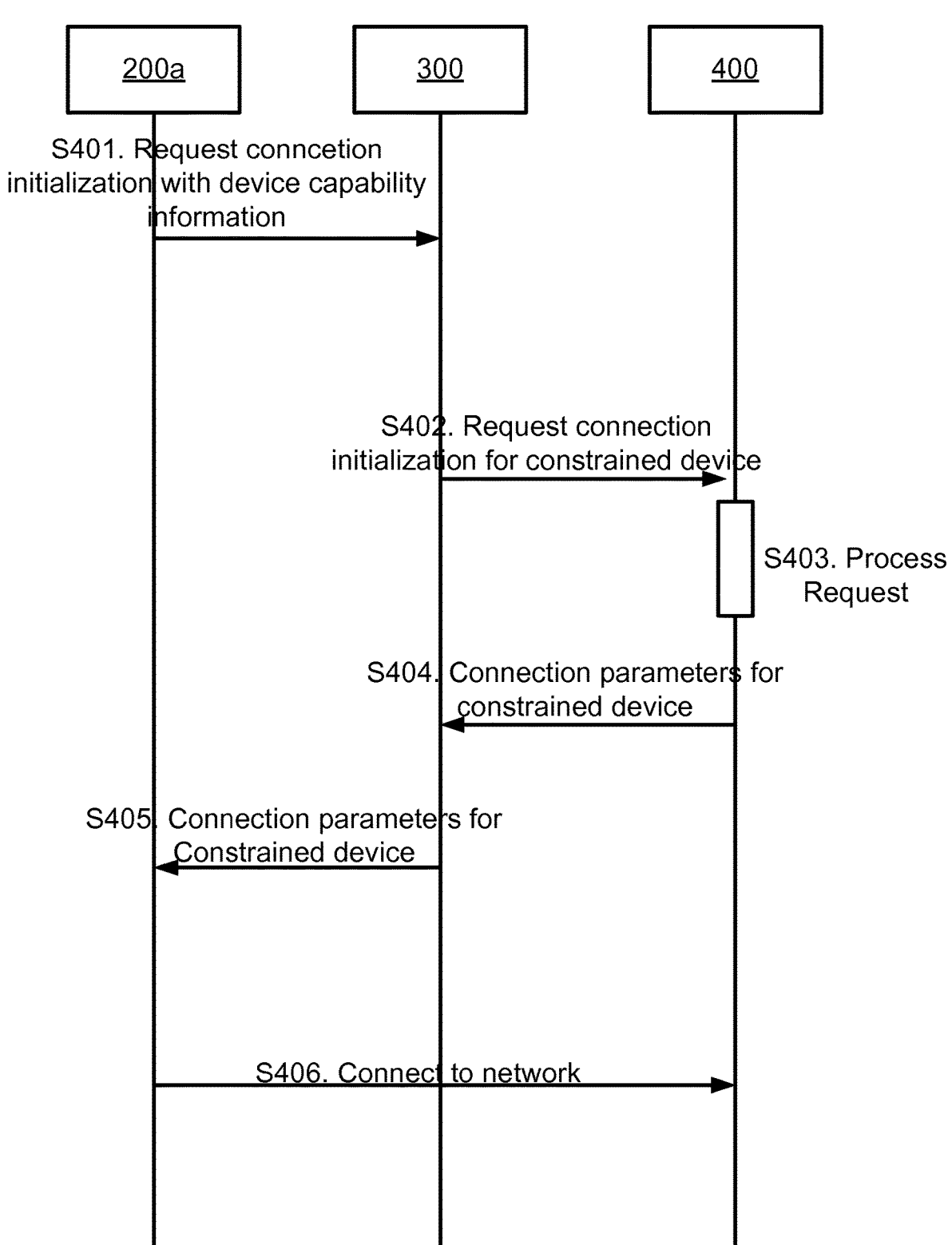

Reference is now made to the signalling diagram of FIG. 5 illustrating a first particular embodiment for initial network access for the first wireless communication device 200a to the wireless network 100 based on at least some of the above disclosed embodiments.

S401: The first wireless communication device 200a provides, as part of performing initial access of the first wireless communication device 200a to the wireless network 100, a request to the second wireless communication device 300 for assisted connection initialization of the first wireless communication device 200a to the wireless network 100, as in step S104. The second wireless communication device 300 obtains the request, as in step S204.

S402: The second wireless communication device 300 provides a request to a network entity 400 of the wireless network 100 for connection initialization of the first wireless communication device 200a to the wireless network 100, as in step S206. The network entity 400 obtains the request, as in step S302.

S403: The network entity 400 processes the request, as in steps S304 and S306.

S404: The network entity 400 provides the network configuration for the first wireless communication device 200a to the second wireless communication device 300, as in step S308. The second wireless communication device 300 obtains the network configuration, as in step S208.

S405: The second wireless communication device 300 provides connection parameters to the first wireless communication device 200a, wherein the parameters are based on the network configuration and comprises information enabling the first wireless communication device 200a to establish a connection to the wireless network 100 without further assistance from the second wireless communication device 300, as in step S210. The first wireless communication device 200a obtains the connection parameters, as in step S106.

S406: The first wireless communication device 200a establishes, using the connection parameters and without further assistance from the second wireless communication device 300, a connection to the wireless network 100, as in step S108.

Figure 6:
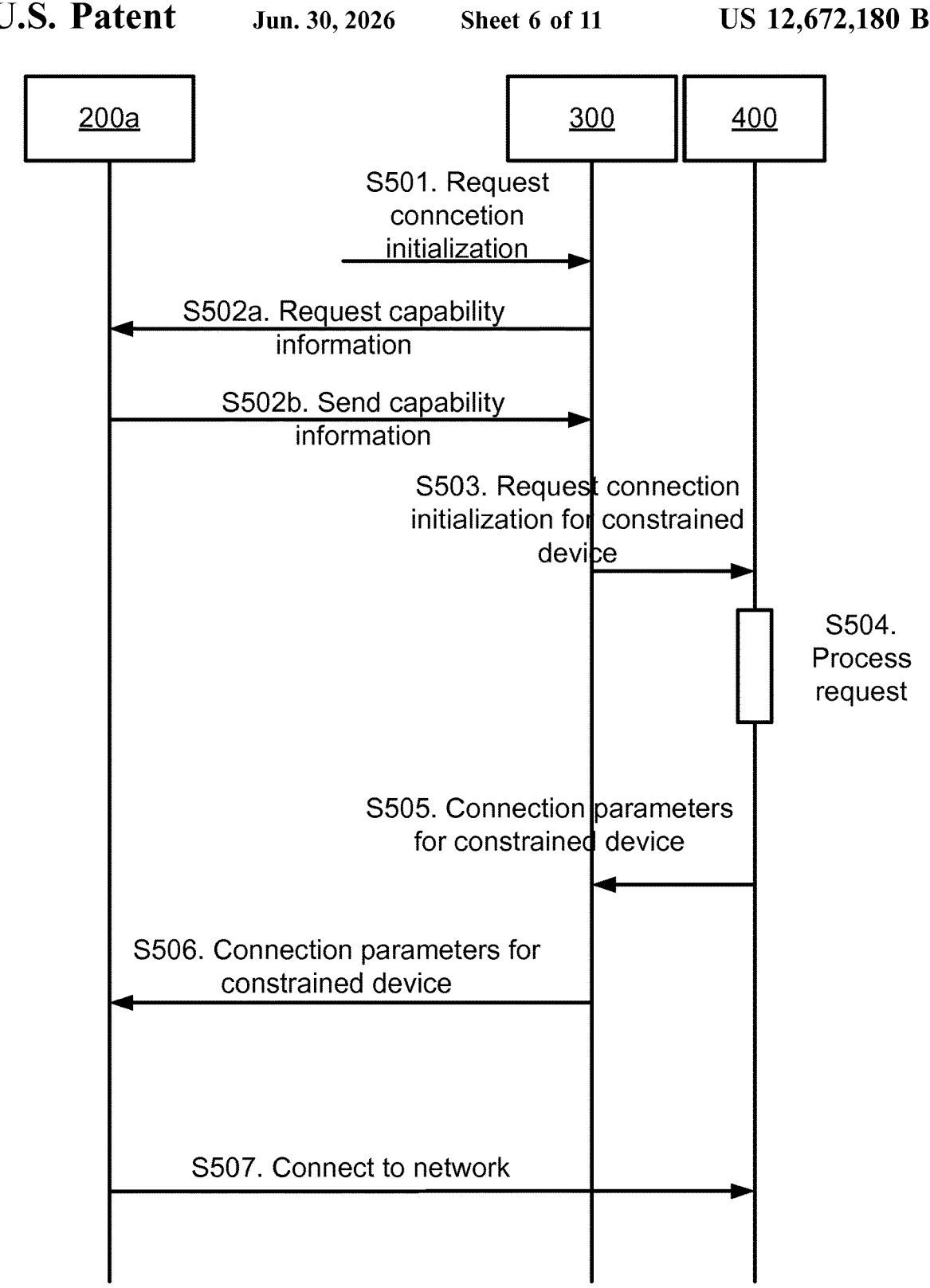

Reference is now made to the signalling diagram of FIG. 6 illustrating a second particular embodiment for initial network access for the first wireless communication device 200a to the wireless network 100 based on at least some of the above disclosed embodiments. The embodiment in FIG. 6 is representative of a scenario where the request for assisted connection initialization is obtained from a user interface of the second wireless communication device 300.

S501: The second wireless communication device 300 obtains, and as part of initial access of the first wireless communication device 200a to the wireless network 100, a request for assisted connection initialization of the first wireless communication device 200a to the wireless network 100, as in step S204. The request for assisted connection initialization is obtained from a user interface of the second wireless communication device 300.

S502a: The second wireless communication device 300 transmits a signal requesting capability information of the first wireless communication device 200a, as in step S202.

S502b: The first wireless communication device 200a provides a response with its capability information to the second wireless communication device 300, as in step S104b.

S503: The second wireless communication device 300 provides a request to a network entity 400 of the wireless network 100 for connection initialization of the first wireless communication device 200a to the wireless network 100, as in step S206. The network entity 400 obtains the request, as in step S302.

S504: The network entity 400 processes the request, as in steps S304 and S306.

S505: The network entity 400 provides the network configuration for the first wireless communication device 200a to the second wireless communication device 300, as in step S308. The second wireless communication device 300 obtains the network configuration, as in step S208.

S506: The second wireless communication device 300 provides connection parameters to the first wireless communication device 200a, wherein the parameters are based on the network configuration and comprises information enabling the first wireless communication device 200a to establish a connection to the wireless network 100 without further assistance from the second wireless communication device 300, as in step S210. The first wireless communication device 200a obtains the connection parameters, as in step S106.

S507: The first wireless communication device 200a establishes, using the connection parameters and without further assistance from the second wireless communication device 300, a connection to the wireless network 100, as in step S108.

Figure 7:
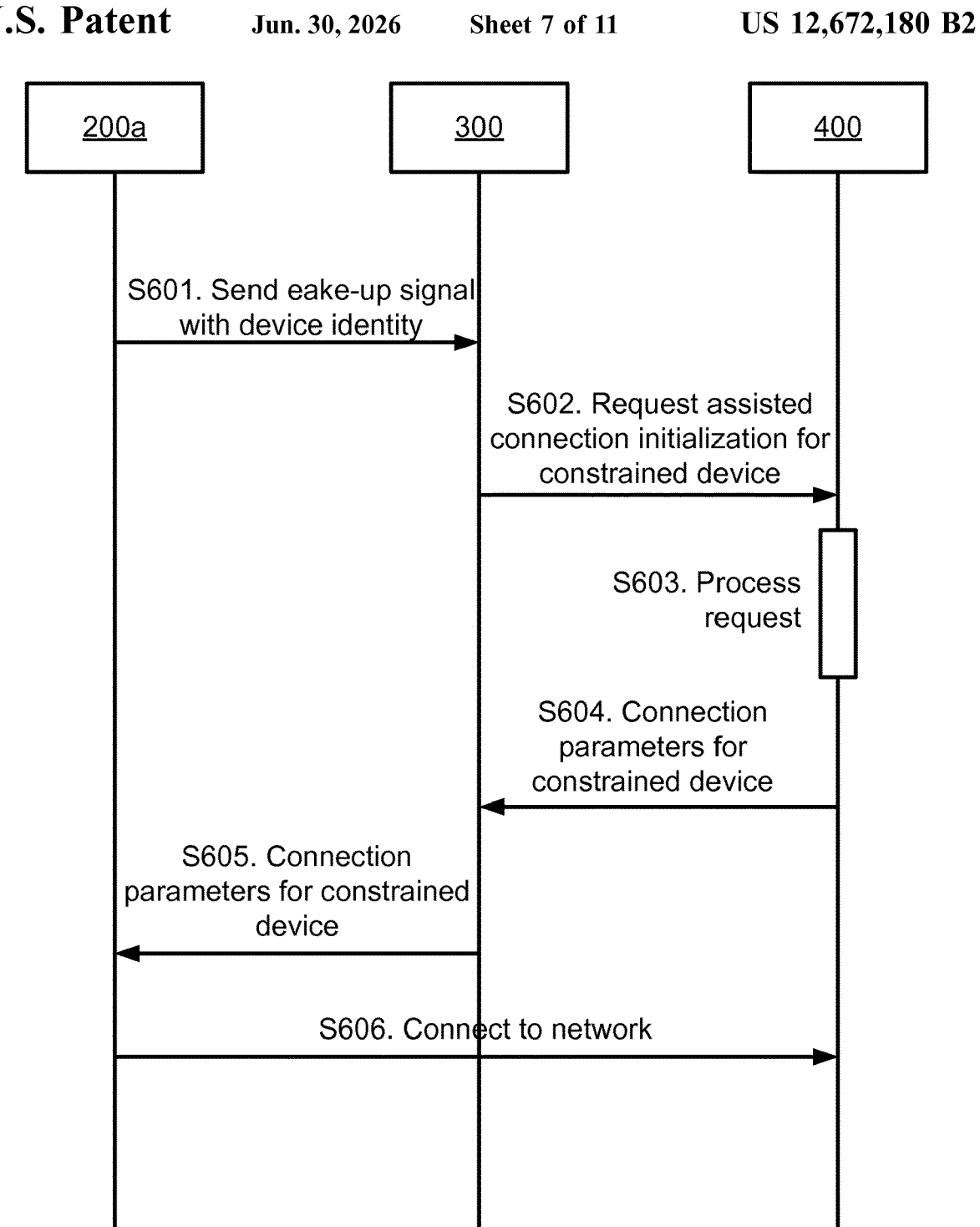

Reference is now made to the signalling diagram of FIG. 7 illustrating a third particular embodiment for initial network access for the first wireless communication device 200a to the wireless network 100 based on at least some of the above disclosed embodiments. The embodiment in FIG. 7 is representative of a scenario where the request for assisted connection initialization is provided in a wake-up signal transmitted from the first wireless communication device 200a to the second wireless communication device 300.

S601: The first wireless communication device 200a provides, as part of performing initial access of the first wireless communication device 200a to the wireless network 100, a request to the second wireless communication device 300 for assisted connection initialization of the first wireless communication device 200a to the wireless network 100, as in step S104. The second wireless communication device 300 obtains the request, as in step S204. The request is provided in a wake-up signal transmitted from the first wireless communication device 200a to the second wireless communication device 300.

S602: The second wireless communication device 300 provides a request to a network entity 400 of the wireless network 100 for connection initialization of the first wireless communication device 200a to the wireless network 100, as in step S206. The network entity 400 obtains the request, as in step S302 S603: The network entity 400 processes the request, as in steps S304 and S306.

S604: The network entity 400 provides the network configuration for the first wireless communication device 200a to the second wireless communication device 300, as in step S308. The second wireless communication device 300 obtains the network configuration, as in step S208.

S605: The second wireless communication device 300 provides connection parameters to the first wireless communication device 200a, wherein the parameters are based on the network configuration and comprises information enabling the first wireless communication device 200a to establish a connection to the wireless network 100 without further assistance from the second wireless communication device 300, as in step S210. The first wireless communication device 200a obtains the connection parameters, as in step S106.

S606: The first wireless communication device 200a establishes, using the connection parameters and without further assistance from the second wireless communication device 300, a connection to the wireless network 100, as in step S108.

Figure 8:
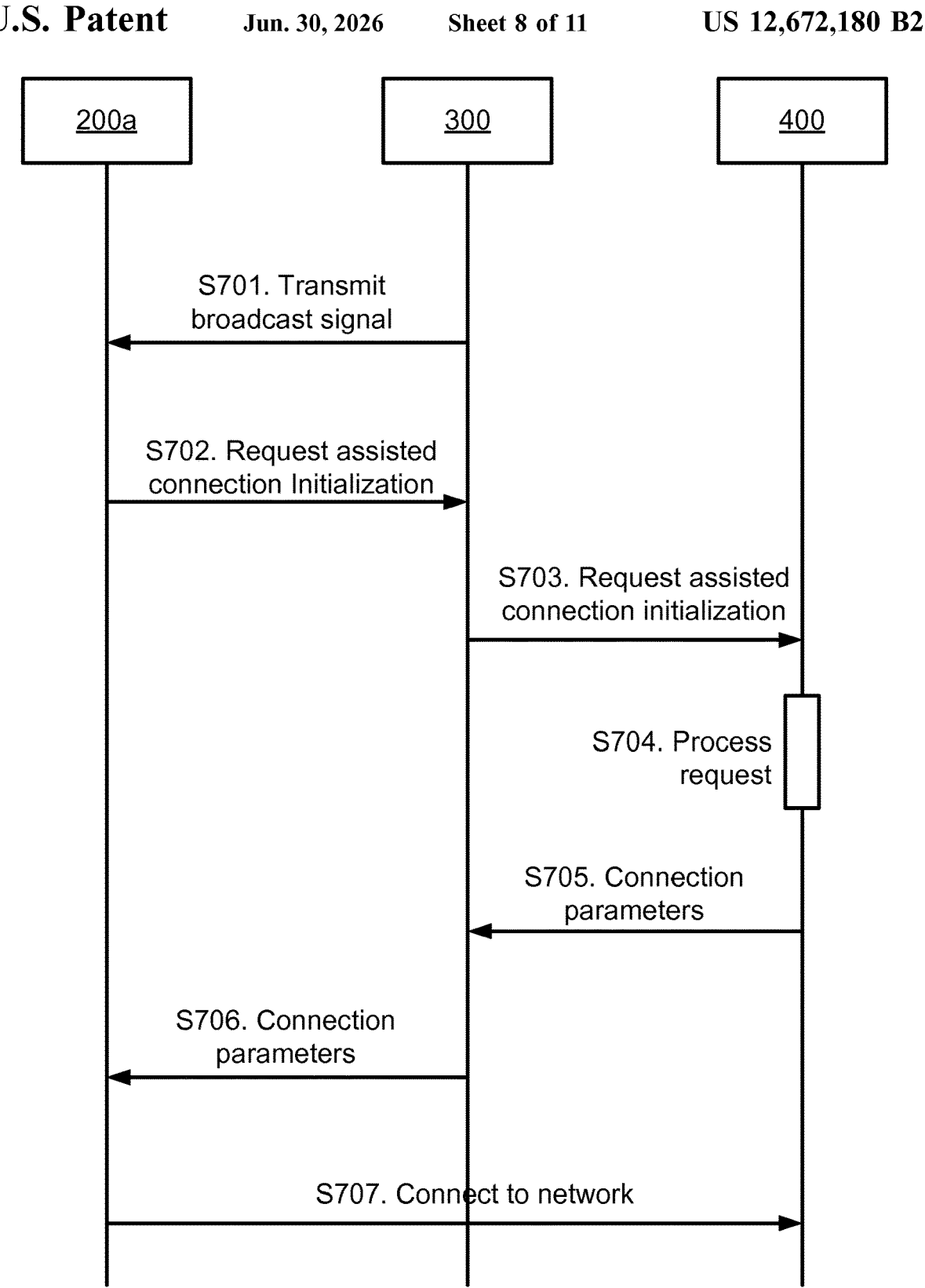

Reference is now made to the signalling diagram of FIG. 8 illustrating a fourth particular embodiment for initial network access for the first wireless communication device 200a to the wireless network 100 based on at least some of the above disclosed embodiments. The embodiment in FIG. 8 is representative of a scenario where the second wireless communication device 300 transmits a broadcast signal and where the first wireless communication device 200a responds to the broadcast signal by providing the request for assisted connection initialization to the second wireless communication device 300.

S701: The second wireless communication device 300 transmits a signal, as in step S202. The first wireless communication device 200a receives the signal, as in step S102. The signal is a broadcast signal, and the broadcast signal comprises identity information of the second wireless communication device 300.

S702: The first wireless communication device 200a provides, as part of performing initial access of the first wireless communication device 200a to the wireless network 100, a request to the second wireless communication device 300 for assisted connection initialization of the first wireless communication device 200a to the wireless network 100, as in step S104. The second wireless communication device 300 obtains the request, as in step S204. The request is provided in a wake-up signal transmitted from the first wireless communication device 200a to the second wireless communication device 300.

S703: The second wireless communication device 300 provides a request to a network entity 400 of the wireless network 100 for connection initialization of the first wireless communication device 200a to the wireless network 100, as in step S206. The network entity 400 obtains the request, as in step S302 S704: The network entity 400 processes the request, as in steps S304 and S306.

S705: The network entity 400 provides the network configuration for the first wireless communication device 200a to the second wireless communication device 300, as in step S308. The second wireless communication device 300 obtains the network configuration, as in step S208.

S706: The second wireless communication device 300 provides connection parameters to the first wireless communication device 200a, wherein the parameters are based on the network configuration and comprises information enabling the first wireless communication device 200a to establish a connection to the wireless network 100 without further assistance from the second wireless communication device 300, as in step S21o. The first wireless communication device 200a obtains the connection parameters, as in step S106.

S707: The first wireless communication device 200a establishes, using the connection parameters and without further assistance from the second wireless communication device 300, a connection to the wireless network 100, as in step S108.

Reference is now made to the signalling diagram of FIG. 9 illustrating a sixth particular embodiment for initial network access for the first wireless communication device 200a to the wireless network 100 based on at least some of the above disclosed embodiments. The embodiment in FIG. 9 is representative of a scenario where the second wireless communication device 300 transmits a wake-up signal and where the first wireless communication device 200a responds to the wake-up signal by providing the request for assisted connection initialization to the second wireless communication device 300.

S801: The second wireless communication device 300 transmits a signal, as in step S202. The first wireless communication device 200a receives the signal, as in step S102. The signal is a wake-up signal, and the wake-up signal comprises identity information of the second wireless communication device 300.

S802: The first wireless communication device 200a provides, as part of performing initial access of the first wireless communication device 200a to the wireless network 100, a request to the second wireless communication device 300 for assisted connection initialization of the first wireless communication device 200a to the wireless network 100, as in step S104. The second wireless communication device 300 obtains the request, as in step S204. The request is provided in a wake-up signal transmitted from the first wireless communication device 200a to the second wireless communication device 300.

S803: The second wireless communication device 300 provides a request to a network entity 400 of the wireless network 100 for connection initialization of the first wireless communication device 200a to the wireless network 100, as in step S206. The network entity 400 obtains the request, as in step S302 S804: The network entity 400 processes the request, as in steps S304 and S306.

S805: The network entity 400 provides the network configuration for the first wireless communication device 200a to the second wireless communication device 300, as in step S308. The second wireless communication device 300 obtains the network configuration, as in step S208.

S806: The second wireless communication device 300 provides connection parameters to the first wireless communication device 200a, wherein the parameters are based on the network configuration and comprises information enabling the first wireless communication device 200a to establish a connection to the wireless network 100 without further assistance from the second wireless communication device 300, as in step S210. The first wireless communication device 200a obtains the connection parameters, as in step S106.

S807: The first wireless communication device 200a establishes, using the connection parameters and without further assistance from the second wireless communication device 300, a connection to the wireless network 100, as in step S108.

Figure 10:
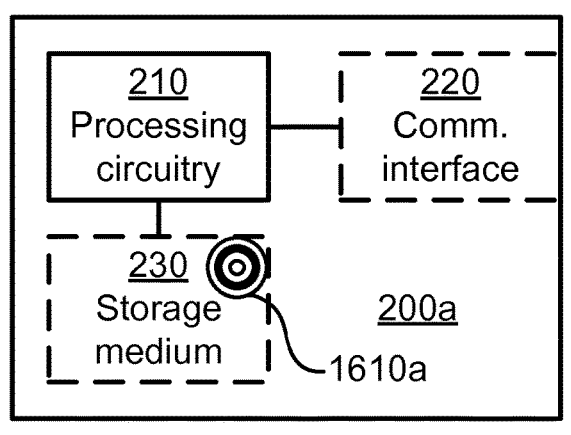
FIG. 10 is a schematic diagram showing functional units of a first wireless communication device according to an embodiment.

FIG. 10 schematically illustrates, in terms of a number of functional units, the components of a first wireless communication device 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1610a (as in FIG. 16), e.g. in the form of a storage medium 230. The processing circuitry 210 may further be provided as at least one application specific integrated circuit (ASIC), or field programmable gate array (FPGA).

Particularly, the processing circuitry 210 is configured to cause the first wireless communication device 200a to perform a set of operations, or steps, as disclosed above. For example, the storage medium 230 may store the set of operations, and the processing circuitry 210 may be configured to retrieve the set of operations from the storage medium 230 to cause the first wireless communication device 200a to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The first wireless communication device 200a may further comprise a communications interface 220 for communications with other functions, nodes, devices, and entities of the communication network 100. As such the communications interface 220 may comprise one or more transmitters and receivers, comprising analogue and digital components.

The processing circuitry 210 controls the general operation of the first wireless communication device 200a e.g. by sending data and control signals to the communications interface 220 and the storage medium 230, by receiving data and reports from the communications interface 220, and by retrieving data and instructions from the storage medium 230. Other components, as well as the related functionality, of the first wireless communication device 200a are omitted in order not to obscure the concepts presented herein.

Figure 11:
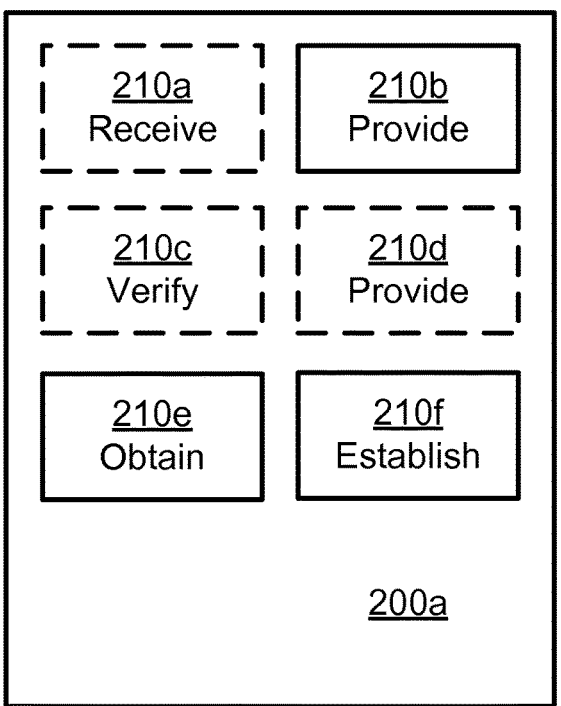
FIG. 11 is a schematic diagram showing functional modules of a first wireless communication device according to an embodiment.

FIG. 11 schematically illustrates, in terms of a number of functional modules, the components of a first wireless communication device 200a according to an embodiment. The first wireless communication device 200a of FIG. 11 comprises a number of functional modules; a first provide module 210b configured to perform step S104, an obtain module 210e configured to perform step S106, and an establish module 210f configured to perform step S108. The first wireless communication device 200a of FIG. 11 may further comprise a number of optional functional modules, such as any of a receive module 210a configured to perform step S102, a verify module 210c configured to perform step S104a, and a second provide module 210d configured to perform step S104b.

In general terms, each functional module 210a-210f may be implemented in hardware or in software. Preferably, one or more or all functional modules 210a-210f may be implemented by the processing circuitry 210, possibly in cooperation with the communications interface 220 and the storage medium 230. The processing circuitry 210 may thus be arranged to from the storage medium 230 fetch instructions as provided by a functional module 210a-210f and to execute these instructions, thereby performing any steps of the first wireless communication device 200a as disclosed herein.

Examples of first wireless communication devices 200a have been disclosed above with reference to FIG. 1.

Figure 12:
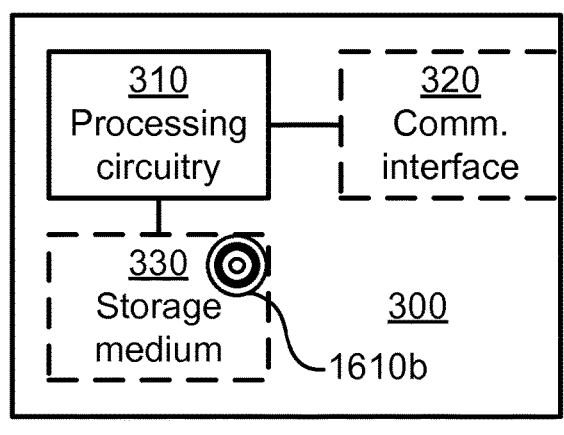
FIG. 12 is a schematic diagram showing functional units of a second wireless communication device according to an embodiment.

FIG. 12 schematically illustrates, in terms of a number of functional units, the components of a second wireless communication device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1610b (as in FIG. 16), e.g. in the form of a storage medium 330. The processing circuitry 310 may further be provided as at least one application specific integrated circuit (ASIC), or field programmable gate array (FPGA).

Particularly, the processing circuitry 310 is configured to cause the second wireless communication device 300 to perform a set of operations, or steps, as disclosed above. For example, the storage medium 330 may store the set of operations, and the processing circuitry 310 may be configured to retrieve the set of operations from the storage medium 330 to cause the second wireless communication device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The second wireless communication device 300 may further comprise a communications interface 320 for communications with other functions, nodes, devices, and entities of the communication network 100. As such the communications interface 320 may comprise one or more transmitters and receivers, comprising analogue and digital components.

The processing circuitry 310 controls the general operation of the second wireless communication device 300 e.g.

by sending data and control signals to the communications interface 320 and the storage medium 330, by receiving data and reports from the communications interface 320, and by retrieving data and instructions from the storage medium 330. Other components, as well as the related functionality, of the second wireless communication device 300 are omitted in order not to obscure the concepts presented herein.

Figure 13:
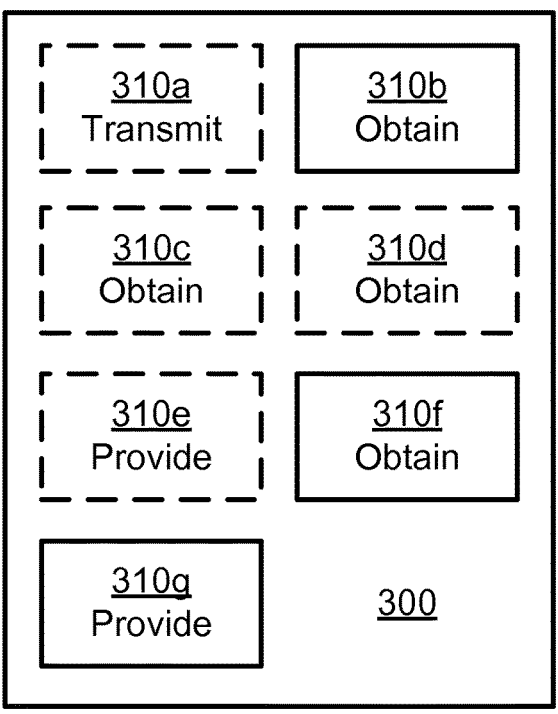
FIG. 13 is a schematic diagram showing functional modules of a second wireless communication device according to an embodiment.

FIG. 13 schematically illustrates, in terms of a number of functional modules, the components of a second wireless communication device 300 according to an embodiment. The second wireless communication device 300 of FIG. 13 comprises a number of functional modules; a first obtain module 310b configured to perform step S204, a fourth obtain module 310f configured to perform step S208, and a second provide module 310g configured to perform step S210. The second wireless communication device 300 of FIG. 13 may further comprise a number of optional functional modules, such as any of a transmit module 310a configured to perform step S202, a second obtain module 310c configured to perform step S204a, a third obtain module 310d configured to perform step S204b, and a first provide module 310g configured to perform step S206.

In general terms, each functional module 310a-310g may be implemented in hardware or in software. Preferably, one or more or all functional modules 310a-310g may be implemented by the processing circuitry 310, possibly in cooperation with the communications interface 320 and the storage medium 330. The processing circuitry 310 may thus be arranged to from the storage medium 330 fetch instructions as provided by a functional module 310a-310g and to execute these instructions, thereby performing any steps of the second wireless communication device 300 as disclosed herein.

Examples of second wireless communication devices 300 have been disclosed above with reference to FIG. 1.

Figure 14:
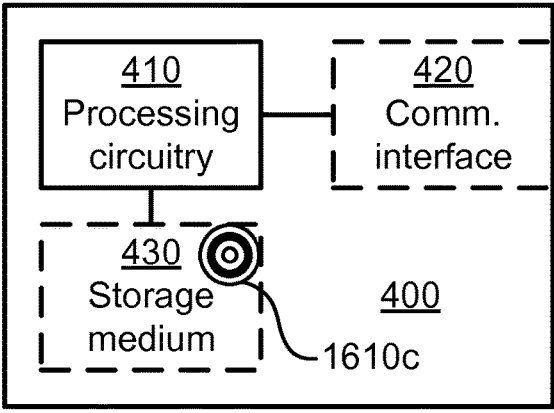
FIG. 14 is a schematic diagram showing functional units of a network entity according to an embodiment.

FIG. 14 schematically illustrates, in terms of a number of functional units, the components of a network entity 400 according to an embodiment. Processing circuitry 410 is provided using any combination of one or more of a suitable central processing unit (CPU), multiprocessor, microcontroller, digital signal processor (DSP), etc., capable of executing software instructions stored in a computer program product 1610c (as in FIG. 16), e.g. in the form of a storage medium 430. The processing circuitry 410 may further be provided as at least one application specific integrated circuit (ASIC), or field programmable gate array (FPGA).

Particularly, the processing circuitry 410 is configured to cause the network entity 400 to perform a set of operations, or steps, as disclosed above. For example, the storage medium 430 may store the set of operations, and the processing circuitry 410 may be configured to retrieve the set of operations from the storage medium 430 to cause the network entity 400 to perform the set of operations. The set of operations may be provided as a set of executable instructions. Thus the processing circuitry 410 is thereby arranged to execute methods as herein disclosed.

The storage medium 330 may also comprise persistent storage, which, for example, can be any single one or combination of magnetic memory, optical memory, solid state memory or even remotely mounted memory.

The network entity 400 may further comprise a communications interface 420 for communications with other functions, nodes, devices, and entities of the communication network 100. As such the communications interface 420 may comprise one or more transmitters and receivers, comprising analogue and digital components.

The processing circuitry 410 controls the general operation of the network entity 400 e.g. by sending data and control signals to the communications interface 420 and the storage medium 430, by receiving data and reports from the communications interface 420, and by retrieving data and instructions from the storage medium 430. Other components, as well as the related functionality, of the network entity 400 are omitted in order not to obscure the concepts presented herein.

Figure 15:
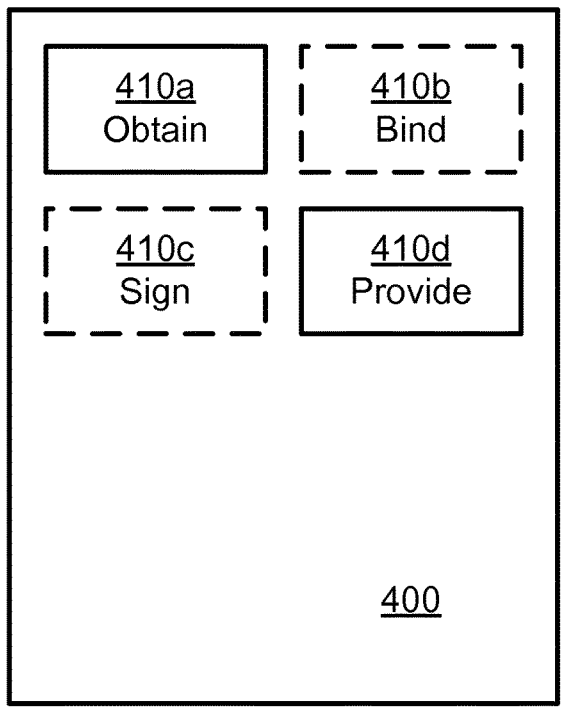
FIG. 15 is a schematic diagram showing functional modules of a network entity according to an embodiment.

FIG. 15 schematically illustrates, in terms of a number of functional modules, the components of a network entity 400 according to an embodiment. The network entity 400 of FIG. 15 comprises a number of functional modules; an obtain module 410a configured to perform step S302 and a provide module 410d configured to perform step S308. The network entity 400 of FIG. 15 may further comprise a number of optional functional modules, such as any of a bind module 410b configured to perform step S304, and a sign module410c configured to perform step S3o6. In general terms, each functional module 410a-410d may be implemented in hardware or in software. Preferably, one or more or all functional modules 410a-410d may be implemented by the processing circuitry 410, possibly in cooperation with the communications interface 420 and the storage medium 430. The processing circuitry 410 may thus be arranged to from the storage medium 430 fetch instructions as provided by a functional module 410a-410d and to execute these instructions, thereby performing any steps of the network entity 400 as disclosed herein.

The network entity 400 may be provided as a standalone device or as a part of at least one further device. For example, as disclosed above with reference to FIG. 1, the network entity 400 may be provided in a node of the radio access network or in a node of the core network. Alternatively, functionality of the network entity 400 may be distributed between at least two devices, or nodes. These at least two nodes, or devices, may either be part of the same network part (such as the radio access network or the core network) or may be spread between at least two such network parts.

Thus, a first portion of the instructions performed by the network entity 400 may be executed in a first device, and a second portion of the the of the instructions performed by the network entity 400 may be executed in a second device; the herein disclosed embodiments are not limited to any particular number of devices on which the instructions performed by the network entity 400 may be executed. Hence, the methods according to the herein disclosed embodiments are suitable to be performed by a network entity 400 residing in a cloud computational environment. Therefore, although a single processing circuitry 410 is illustrated in FIG. 14 the processing circuitry 410 may be distributed among a plurality of devices, or nodes. The same applies to the functional modules 410a-410d of FIG. 15 and the computer program 1620c of FIG. 16.

Figure 16:
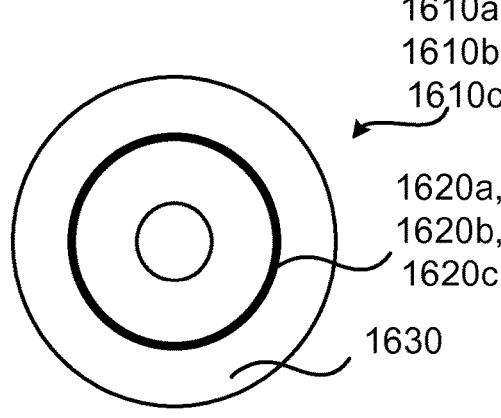
FIG. 16 shows one example of a computer program product comprising computer readable means according to an embodiment.

FIG. 16 shows one example of a computer program product 1610a, 1610b, 1610c comprising computer readable means 1630. On this computer readable means 1630, a computer program 1620a can be stored, which computer program 1620a can cause the processing circuitry 210 and thereto operatively coupled entities and devices, such as the communications interface 220 and the storage medium 230, to execute methods according to embodiments described herein. The computer program 1620a and/or computer program product 1610a may thus provide means for performing any steps of the first wireless communication device 200a as herein disclosed. On this computer readable means 1630, a computer program 1620b can be stored, which computer program 1620b can cause the processing circuitry 310 and thereto operatively coupled entities and devices, such as the communications interface 320 and the storage medium 330, to execute methods according to embodiments described herein. The computer program 1620b and/or computer program product 1610b may thus provide means for performing any steps of the second wireless communication device 300 as herein disclosed. On this computer readable means 1630, a computer program 1620c can be stored, which computer program 1620c can cause the processing circuitry 410 and thereto operatively coupled entities and devices, such as the communications interface 420 and the storage medium 430, to execute methods according to embodiments described herein. The computer program 1620c and/or computer program product 1610c may thus provide means for performing any steps of the network entity 400 as herein disclosed.

In the example of FIG. 16, the computer program product 1610a, 1610b, 1610c is illustrated as an optical disc, such as a CD (compact disc) or a DVD (digital versatile disc) or a Blu-Ray disc. The computer program product 1610a, 1610b, 1610c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1620a, 1620b, 1620c is here schematically shown as a track on the depicted optical disk, the computer program 1620a, 1620b, 1620c can be stored in any way which is suitable for the computer program product 1610a, 1610b, 1610c.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method of enabling initial network access for a group of wireless communications devices to a wireless network, performed by a second wireless communication device, the method comprising:

obtaining a plurality of requests for assisted connection initialization, wherein:

the requests are obtained from the group of wireless communications devices; and the group of wireless communications devices comprises a first wireless communication device and at least one further wireless communication device;

sending, to a network entity of the wireless network, a single connection initialization request for connection initialization of the group;

obtaining, from the network entity in one or more responses to the single connection initialization request, a network configuration for each of the wireless communications devices in the group; and providing, to each of the wireless communications devices in the group, connection parameters based on the network configuration and comprising information enabling each of the wireless communications devices in the group to establish a connection to the wireless network without further assistance from the second wireless communication device.

2. The method of claim 1, wherein the requests for assisted connection initialization comprise identifiers of the wireless communication devices.

3. The method of claim 2, wherein the single connection initialization request to the network entity comprises the identifiers of the wireless communication devices.

4. The method of claim 1, further comprising obtaining capability information of the first wireless communication device.

5. The method of claim 1, wherein the second wireless communication device uses a first communication technology for obtaining the requests and for providing the connection parameters, and uses a second communications technology for sending the single connection initialization request to the network entity.

6. The method of claim 1, wherein the network configuration for each of the wireless communications devices is signed by the network entity.

7. A method of providing initial network access for a group of wireless communications devices to a wireless network, the method comprising a network entity:

obtaining a single connection initialization request, from a second wireless communication device, for connection initialization of the group, wherein the group comprises a first wireless communication device and at least one further wireless communication device; and providing, to the second wireless communication device in one or more responses to the single connection initialization request, a network configuration for each of the wireless communication devices in the group.

8. The method of claim 7, wherein the single connection initialization request obtained from the second wireless communication device comprises identifiers of the wireless communication devices.

9. The method of claim 7, further comprising binding network resources to the first wireless communication device;

wherein the network configuration for the first wireless communication device identifies the network resources bound to the first wireless communication device.

10. The method of claim 7, further comprising signing the network configuration for the first wireless communication device before providing the network configuration for the first wireless communication device to the second wireless communication device.

* * * * *